(12) United States Patent
Nicholson et al.

(10) Patent No.: US 12,394,542 B2
(45) Date of Patent: Aug. 19, 2025

(54) CABLE PREPARATION AND INJECTION SYSTEMS AND METHODS

(71) Applicant: ONESUBSEA IP UK LIMITED, London (GB)

(72) Inventors: Joseph Allan Nicholson, Barrow-in-Furness (GB); Oliver Booth, Barrow in Furness (GB); Wayne Heigh, Barrow in Furness (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/653,741

(22) Filed: Mar. 7, 2022

(65) Prior Publication Data
US 2022/0285052 A1  Sep. 8, 2022

Related U.S. Application Data

(60) Provisional application No. 63/157,020, filed on Mar. 5, 2021.

(51) Int. Cl.
*H01B 13/06* (2006.01)
*B05D 1/26* (2006.01)
(Continued)

(52) U.S. Cl.
CPC ............... *H01B 13/06* (2013.01); *B05D 1/26* (2013.01); *B05D 7/20* (2013.01); *H01B 7/28* (2013.01);
(Continued)

(58) Field of Classification Search
CPC ........ H01R 43/28; H01B 13/06; H01B 13/14; H01B 13/32; H01B 13/327; H01B 7/28; H01B 7/285; B05D 1/26; B05D 7/20
(Continued)

(56) References Cited

U.S. PATENT DOCUMENTS 3,248,472 A * 4/1966 Montesano ............... H01B 9/06
174/23 C
4,526,295 A * 7/1985 Morel .................. B01F 35/7161
222/137
(Continued)

FOREIGN PATENT DOCUMENTS

EP    0198528 A1    10/1986
EP    0646935 A1    4/1995
(Continued)

OTHER PUBLICATIONS

Exam Report Issued under Section 17 in United Kingdom Patent Application No. GB2203158.7 dated May 18, 2022, 4 pages.

*Primary Examiner* — Brian K Talbot
(74) *Attorney, Agent, or Firm* — Jeffrey D. Frantz

(57) ABSTRACT

A method for preparing an electrical cable may include coupling an injection barrel to an electrical cable that includes one or more conductors surrounded by a porous insulating material. The method may also include injecting epoxy resin into a chamber of the injection barrel, and the chamber may be fluidly coupled to an end face of the porous insulating material. Additionally, the method may include pressurizing the chamber such that the epoxy resin is forced to penetrate into the end face of the porous insulating material and removing the injection barrel to expose an epoxy-injected portion of the porous insulating material.

15 Claims, 7 Drawing Sheets

(51) Int. Cl.
  *B05D 7/20* (2006.01)
  *H01B 7/28* (2006.01)
  *H01B 7/285* (2006.01)
  *H01B 13/14* (2006.01)
  *H01B 13/32* (2006.01)
  *H01R 43/28* (2006.01)

(52) U.S. Cl.
  CPC .............. *H01B 7/285* (2013.01); *H01B 13/14* (2013.01); *H01B 13/32* (2013.01); *H01B 13/327* (2013.01); *H01R 43/28* (2013.01)

(58) Field of Classification Search
  USPC ........................................................ 427/117
  See application file for complete search history.

(56) References Cited

U.S. PATENT DOCUMENTS

| | | | | |
|---|---|---|---|---|
| 5,218,011 A | * | 6/1993 | Freeman | H02G 1/16 |
| | | | | 524/517 |
| 6,489,554 B1 | | 12/2002 | Bertini et al. | |
| 7,615,247 B2 | * | 11/2009 | Bertini | H01B 7/285 |
| | | | | 427/117 |
| 7,731,515 B2 | | 6/2010 | Nicholson | |
| 8,572,842 B2 | * | 11/2013 | Bertini | H01B 3/20 |
| | | | | 427/117 |
| 8,946,554 B1 | * | 2/2015 | Petner | H02G 15/046 |
| | | | | 174/77 R |
| 2005/0266155 A1 | * | 12/2005 | Stagi | H01B 13/322 |
| | | | | 427/117 |
| 2006/0102376 A1 | * | 5/2006 | Kuchita | H01B 9/027 |
| | | | | 174/102 SC |
| 2008/0173467 A1 | | 7/2008 | Bertini et al. | |
| 2009/0133799 A1 | * | 5/2009 | Bertini | H02G 1/16 |
| | | | | 156/47 |
| 2012/0033919 A1 | * | 2/2012 | Calac | G02B 6/3816 |
| | | | | 385/76 |
| 2016/0268018 A1 | * | 9/2016 | Sica | H01B 13/22 |
| 2017/0309373 A1 | * | 10/2017 | Tanaka | H01B 7/30 |
| 2019/0006834 A1 | * | 1/2019 | Komori | H02G 15/046 |
| 2020/0081209 A1 | * | 3/2020 | Martin Regalado | H01B 9/02 |
| 2020/0103609 A1 | * | 4/2020 | Lockhart | G02B 6/4472 |
| 2021/0280341 A1 | * | 9/2021 | Chatterton | H01B 7/2813 |

FOREIGN PATENT DOCUMENTS

| | | | | | |
|---|---|---|---|---|---|
| GB | | 1188286 A | * | 4/1970 | ............ H01B 11/00 |
| GB | | 2191902 A | * | 12/1987 | ........... H02G 15/046 |
| WO | WO-8912336 A | | * | 12/1989 | ............ H01R 43/28 |

* cited by examiner

CABLE PREPARATION AND INJECTION SYSTEMS AND METHODS

CROSS-REFERENCE TO RELATED APPLICATION

This application is a non-provisional application claiming priority to and the benefit of U.S. Provisional Application No. 63/157,020, entitled "CABLE INJECTION PROCESS," filed Mar. 5, 2021, both of which are hereby incorporated by reference in their entirety for all purposes.

BACKGROUND

The present disclosure generally relates to systems and methods for preparing a cable end for termination/connection via epoxy injection.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Different industries such as oil and gas, aerospace, nuclear, automotive, and/or general infrastructure utilize electrical cables for a variety of reasons. For example, electrical cables may be used to transmit power, control signals, and/or data signals from one location to another and/or to generate heat (e.g., as resistive heaters). Furthermore, in some scenarios, such cables may need to withstand harsh operating conditions such as high or low ambient pressure, corrosive or debilitating environments, and/or extreme hot or cold temperatures. As such, insulation and environmental protection may be used to surround the conductor of the cable. However, providing terminating ends and/or connections for such cables may prove difficult while maintaining adequate protection and insulation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for preparing an electrical cable may include coupling an injection barrel to an electrical cable that includes one or more conductors surrounded by a porous insulating material. The method may also include injecting epoxy resin into a chamber of the injection barrel, and the chamber may be fluidly coupled to an end face of the porous insulating material. Additionally, the method may include pressurizing the chamber such that the epoxy resin is forced to penetrate into the end face of the porous insulating material, and removing the injection barrel to expose an epoxy-injected portion of the porous insulating material.

In another embodiment, an electrical cable preparation tool may include a cable clamp to be operatively coupled to an outer casing of an electrical cable that includes a conductor surrounded by a porous insulating material. The tool may also include an injection barrel, attachable to the cable clamp, which may include a chamber to be operatively exposed to an end face of the porous insulating material and one or more ports to operatively fill the chamber with an epoxy resin. Additionally, the tool may include a piston that may actuate into the chamber and operatively pressurize the chamber such that the epoxy resin is pressurized against the end face of the porous insulating material.

In another embodiment, a method for connecting a prepared electrical cable may include inserting the prepared electrical cable into a cable connection that includes a first geometry. Moreover, the prepared electrical cable may include a shaped, epoxy-solidified portion of an insulating material that includes a second geometry complementary to the first geometry. Additionally, the prepared electrical cable may be prepared by coupling an injection barrel to an unprepared electrical cable that includes one or more conductors surrounded by the insulating material. Preparation may also include injecting epoxy resin into a chamber of the injection barrel that is fluidly coupled to an end face of the insulating material and pressurizing the chamber such that the epoxy resin is forced to penetrate into the end face of the insulating material. Preparation may further include removing the injection barrel to expose the epoxy-injected portion of the insulating material and shaping the epoxy-injected portion of the insulating material to generate the second geometry.

In another embodiment, an electrical cable may include an outer casing, one or more conductors within the outer casing, and a porous insulating material disposed in an annulus between the outer casing and the one or more conductors. An end face of the porous insulating material may include an epoxy-solidified portion of the porous insulating material penetrating a distance into the porous insulating material in an axial direction from the end face of the porous insulating material.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
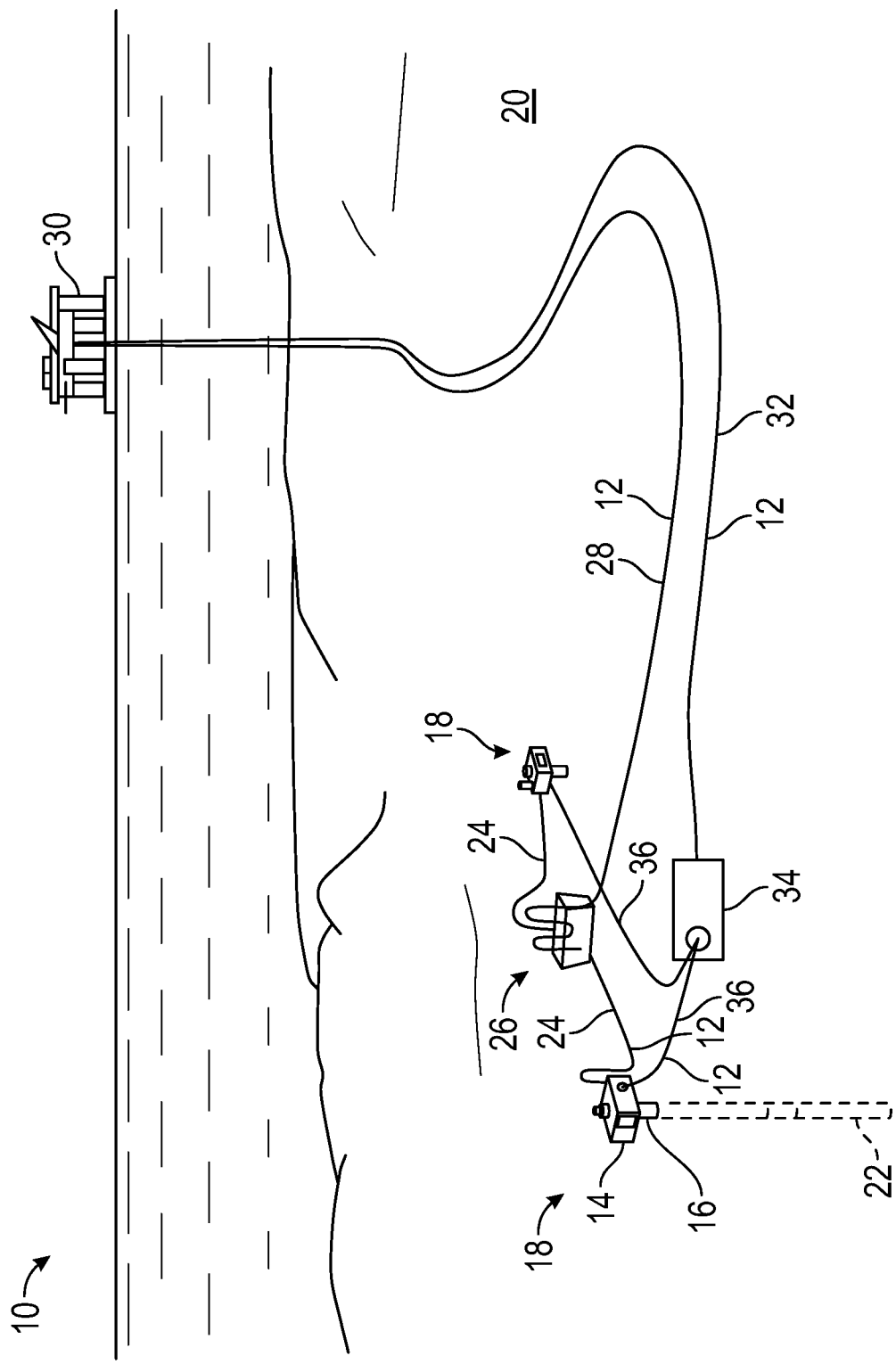
FIG. 1 a schematic view of a subsea production system having electrical cables used for transmitting information and power and/or for heating of equipment and/or pipes, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Hydrocarbon fluids, such as oil and natural gas, may be obtained from subterranean or subsea geologic formations, often referred to as reservoirs, by drilling one or more wells that penetrate the hydrocarbon-bearing geologic formation. In subsea applications, various types of infrastructure may be positioned underwater and/or along a sea floor to aid in retrieving the hydrocarbon fluids. In both land-based and subsea applications, electrical cables may be used to carry power, data signals, and/or control signals and/or for the heating of equipment and pipes. Such electrical cables may transmit high voltages and/or currents. Additionally, in some scenarios, the cables may encounter extreme operating conditions such as low temperatures (e.g., less than 20 degrees, less than zero degrees, or less than −20 degrees Celsius), high temperatures (e.g., above 40 degrees, above 70 degrees, above 100 degrees, or above 130 degrees Celsius), temperature variations between low and high temperatures within a short time frame (e.g., seconds, minutes, or hours), and/or corrosive environments such as downhole or subsea. As such, one or more electrical conductors within a cable may be surrounded by one or more layers of an electrically insulating material and/or one or more layers of additional protective materials. These layers of materials may function as an insulating barrier (e.g., electrical and/or thermal insulating barrier), a chemical barrier (e.g., corrosion resistant barrier, oxidation resistant barrier, etc.), a mechanical barrier (e.g., impact resistant barrier), or a combination thereof, between the conductor(s) and the surrounding environment.

In some embodiments, the cable may include one or more electrical conductors surrounded by a porous insulating material. The insulating material may include a loose or tightly packed fill of insulating elements, such as insulating fibers, powder, or other discrete particles distributed about the electrical conductors. The insulating material may include one or more of polymers, ceramics, porcelains, glass, fabrics, or any combination thereof. For example, a mineral insulator such as an inorganic powder (e.g., magnesium oxide (MGO) or other ceramic) may be used to fill an annulus between the conductor(s) and an outer casing to form the cable. Such insulated cables may be suitable for high heat (e.g., greater than or up to 200 degrees, greater than or up to 400 degrees, greater than or up to 600 degrees Celsius, etc.) environments, which may be advantageous for heating (e.g., pipeline heating). In the case of multiple conductors, the individual conductors may or may not include individual shielding or other insulation between the conductors.

In some scenarios, the porous and/or powdered insulating material may be hydroscopic (i.e., tending to absorb moisture). Additionally, it is noted that powdered insulating materials may be structurally unstable and have a tendency to crumble or otherwise lose their form when handled. Furthermore, if allowed to absorb moisture, the electrical (e.g., insulating) properties of the porous and/or powdered insulating material may be altered and/or degraded, reducing the effectiveness, efficiency, and/or efficacy of the cable. As such, when preparing ends of the cable for termination/connection it may be desired to effectively seal the porous and/or powdered insulating material such that moisture does not permeate through the cable from the exposed end during and/or after a connection is formed.

In some scenarios, oil may be utilized as a moisture barrier for the porous and/or powdered insulating material. However, being a fluid, oil may still allow some moisture to gain access to the porous and/or powdered insulating material, as well as form air bubbles, and has little structural integrity. Alternatively, in some embodiments, the insulating annulus of porous and/or powdered insulating material may be injected with a solidifying material (e.g., adhesives, sealants, encapsulating materials, etc.), such that the solidifying material can be injected in one state (e.g., liquid, gel, etc.) into the insulating material and subsequently harden into another state (e.g., solid) that generates a solid end portion of the cable. The solidifying material may include one or more epoxy resins, polymers (e.g., thermosetting polymers), polyester, vinyl, polyimides, polyurethane, nylon, or any combination thereof. However, the following discussion may refer to an epoxy material as an example of a solidifying material to penetrate an end of a cable. For example, the solidifying material may include a dielectric epoxy resin to seal the end face of the insulating annulus. Additionally, the epoxy-solidified insulating material may provide structural integrity at the end face of insulating annulus, which may assist in forming a stable physical connection for the cable. For example, the end face of the insulating annulus may be shaped using a cutting tool for proper fitment of a cable connection, which may provide improved (e.g., increased) tracking resistance at the connection.

In some embodiments, to prepare the electrical cable for termination/connection via epoxy resin injection, a length of the outer casing and insulating material may be removed leaving a portion of the conductor exposed. A cable clamp may be fitted around the outer casing near the open end face of the outer casing to allow an injection barrel to be attached to the electrical cable via the cable clamp. The injection barrel may include one or more ports for filling a chamber of the injection barrel with epoxy and evacuating air from the chamber. In some embodiments, the injection barrel may form a seal with the cable clamp, and a piston, coupled to the injection barrel, may be actuated to pressurize the epoxy within the chamber, forcing the epoxy to permeate into the insulating material. After the epoxy has been injected, the injection barrel and cable clamp may be removed before curing, after curing, or at an intermediate stage of curing. After curing, the insulating material may then have an epoxy-solidified portion that penetrates a distance into the end face of the cable. Moreover, the epoxy-solidified portion of the insulating material may then be shaped as desired for termination/connection.

With the foregoing in mind, FIG. 1 is a schematic view of a subsea production system 10 with electrical cables 12 used for transmitting information and power and/or heating of equipment and/or pipes, according to an embodiment of the present disclosure. Additionally, the subsea production system may include a subsea tree 14 coupled to a wellhead 16 to form a subsea station 18 that extracts formation fluid, such as oil and/or natural gas, from the sea floor 20 through the well 22. In some embodiments, the subsea production system 10 may include multiple subsea stations 18 that extract formation fluid from respective wells 22. After passing through the subsea tree 14, the formation fluid flows through jumper cables 24 to a pipeline manifold 26. The pipeline manifold 26 may connect to one or more flowlines 28 to enable the formation fluid to flow from the wells 22 to a surface platform 30. In some embodiments, the surface platform 30 may include a floating production, storage, and offloading unit (FPSO) or a shore-based facility. In addition to flowlines 28 that carry the formation fluid away from the wells 22, the subsea production system 10 may include lines or conduits 32 that supply fluids, as well as carry control and data lines to the subsea equipment. These conduits 32 connect to a distribution module 34, which in turn couples to the subsea stations 18 via supply lines 36. In scenarios, the platform 30 may be located a significant distance (e.g., greater than 100 m, greater than 1 km, greater than 10 km, or greater than 60 km) away from the wells 22.

As fluids (e.g., reservoir fluids) flow between the wells 22 and the platform 30 the fluids may cool, potentially slowing flow (e.g., due to increased viscosity) and/or allowing wax and/or hydrates to form. To prevent such undesired effects, heating elements, such as insulated cables (e.g., electrical cables 12), may be used to heat the flowlines 28.

As should be appreciated, each of the jumper cables 24, flowlines 28, conduits 32, supply lines 36, and/or other equipment may include electrical cables 12 for heating (e.g., resistive heating) and/or for transmitting power/electrical signals. Moreover, as should be appreciated, such electrical cables 12 may also be used on the surface (e.g., above water) above ground or buried for land-based operations. For example, electrical cables 12 may be used in regions of cold temperatures to heat pipes and/or equipment to facilitate the flow of oil or other fluids through the pipes/equipment and/or to prevent freezing. Furthermore, although discussed herein as relating to oil and gas technologies, as should be appreciated, aspects of the present disclosure may be applicable to electrical cables 12 used in many different fields such as aerospace, nuclear, automotive, and/or civil infrastructure.

Figure 2:
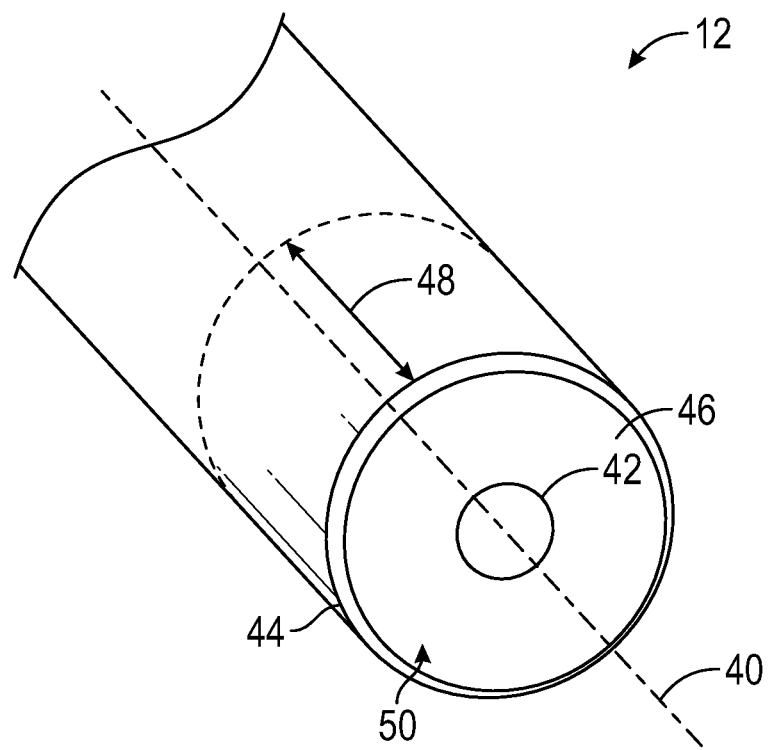
FIG. 2 is a perspective view of an electrical cable having a conductor, an insulating material, and an outer casing, according to an embodiment of the present disclosure.

FIG. 2 is a perspective view of an electrical cable 12 disposed along an axial axis 40, according to an embodiment of the present disclosure. The electrical cable 12 includes one or more conductors 42, an outer casing 44, and an insulating material 46 forming an annulus therebetween. The conductor 42 may be any suitable conductive material such as copper, nickel, aluminum, gold, silver, etc. or any suitable conductive alloy (e.g., nickel-iron alloy, steel, etc.). Additionally, the outer casing 44 may include any suitable rigid housing such as steel, iron, copper, etc. or flexible housing such as a polymer. In some embodiments, the electrical cable 12 may be a mineral insulated cable having a porous and/or powdered insulating material 46 such as MGO or other mineral or ceramic. As should be appreciated, while MGO is discussed herein as a suitable insulating material 46, other insulating materials that are porous enough to allow for injection of a solidifying material (e.g., epoxy) may also be utilized. For example, the insulating material 46 may include one or more of polymers, ceramics, porcelains, glass, fabrics, or any combination, wherein the insulating material 46 may be porous or distributed as a plurality of insulating elements (e.g., powder, fibers, particles, etc.).

Figure 3:
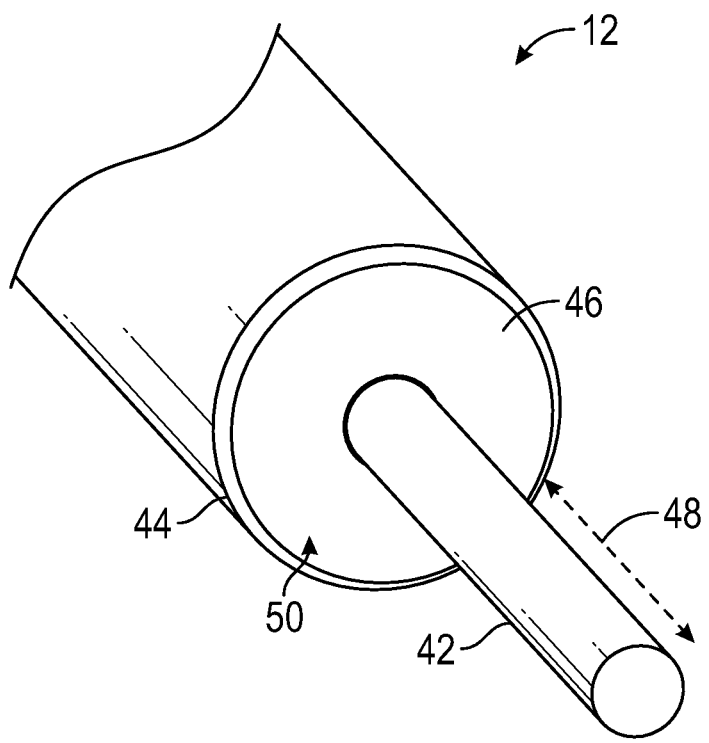
FIG. 3 is a perspective view of the electrical cable of FIG. 2 with a length of the outer casing and insulating material removed, according to an embodiment of the present disclosure.

To facilitate preparation for injection and a subsequent connection, a length 48 of the insulating material 46 and outer casing 44, measured from the end face 50 of the insulating material 46, may be removed, as shown in FIG. 3. For example, an orbital cut may be made around the circumference of the outer casing 44 and/or one or more longitudinal cuts may be performed down the length 48 of the outer casing 44 that is to be removed. In the case of a powdered insulating material 46, the exposed portion of the conductor 42 may be cleaned of excess insulating material 46. As should be appreciated, while discussed herein as exposing a portion of the conductor 42 by cutting back the insulating material 46 and outer casing 44, different shapes and types of terminations/connections may leave the end face 50 of the insulating material 46 flush with or at different angles relative to the conductor 42 during the injection process.

Figure 4:
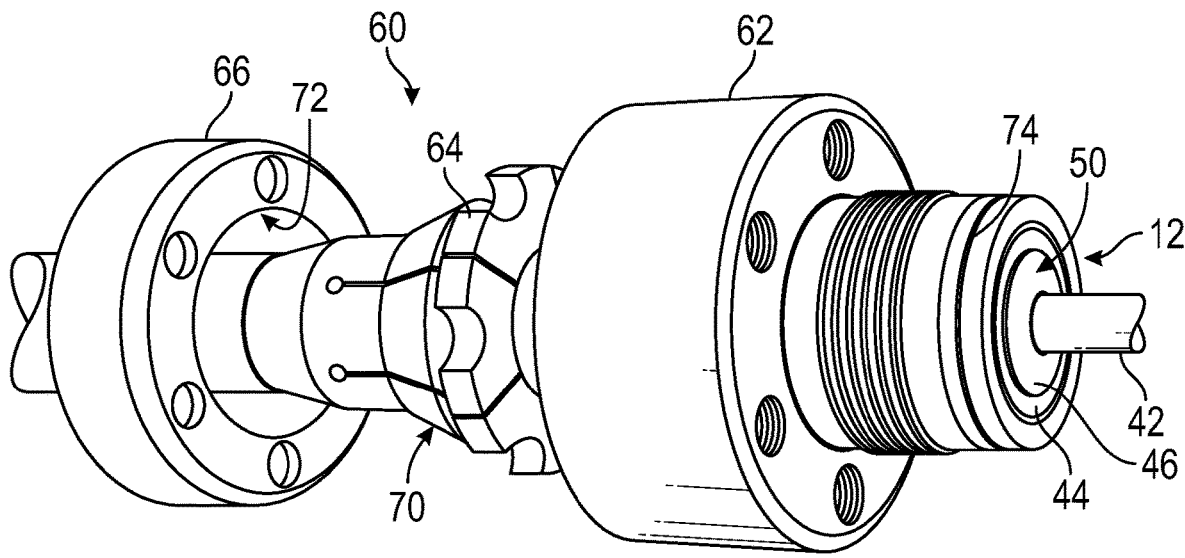
FIG. 4 is a perspective view of an example cable clamp disposed on the electrical cable of FIG. 3, according to an embodiment of the present disclosure.

To facilitate injecting an epoxy or other setting resin/fluid into the insulating material 46, a cable clamp 60 may be coupled around the outer casing 44, as shown in FIG. 4. The cable clamp 60 may form a stable basis from which to force the epoxy into the annulus, between the outer casing 44 and the conductor 42, occupied by the insulating material 46. In some embodiments, the cable clamp 60 may utilize a compression fitting to be secured to the electrical cable 12. For example, the cable clamp 60 may include a clamp body 62 (e.g., annular clamp body), a clamp collet 64 (e.g., annular clamp collet), and a clamp collar 66 (e.g., annular clamp collar). The clamp collet 64 may be compressed by the clamp collar 66 as the clamp body 62 and the clamp collar 66 are secured (e.g., bolted) together such that, as a whole, the cable clamp 60 is secured around the outer casing 44 of the electric cable 12. In some embodiments, the clamp body 62 or other portion of the cable clamp 60 may be near and/or flush with the end face 50 of the insulating material 46 to facilitate directing the epoxy into the annulus. As should be appreciated, although described herein as a compression fitting, the cable clamp 60 may use any other suitable securements to couple to the electrical cable 12 such as threads along the outer casing 44 and/or a compression fitting, or threads, on a portion of the conductor 42.

Figure 5:
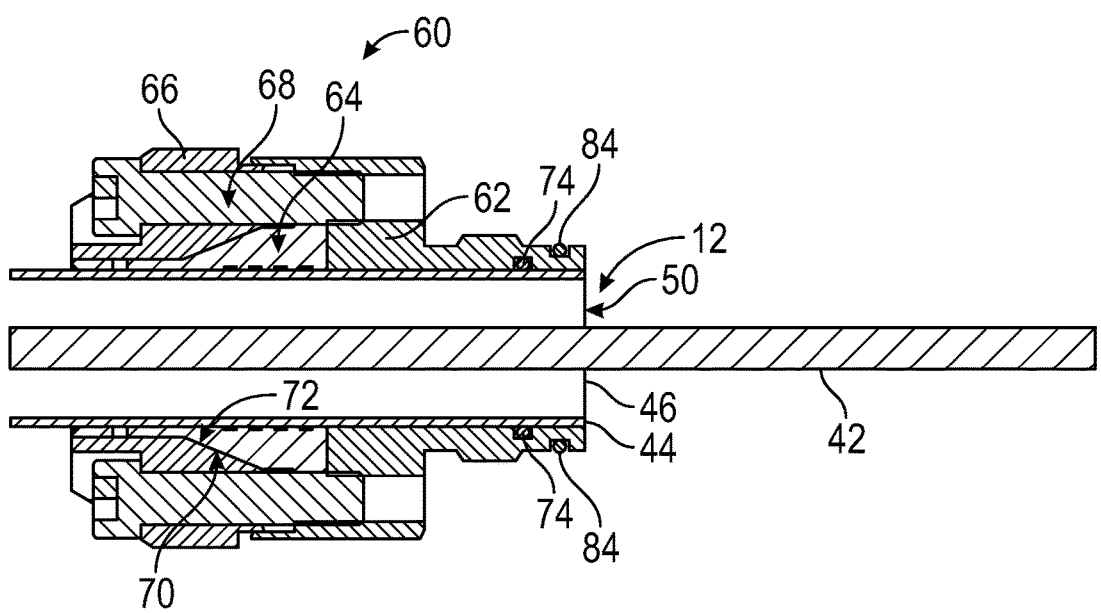
FIG. 5 is a schematic cross-sectional view of the example cable clamp secured onto the outer casing of the electrical cable, according to an embodiment of the present disclosure.

FIG. 5 is a schematic cross-sectional view of the cable clamp 60 coupled to the outer casing 44 of the electrical cable 12, according to an embodiment of the present disclosure. As one or more fasteners 68 (e.g., bolts, screws, nuts, etc.) are secured between the clamp collar 66 and the clamp body 62, an axial force is applied by the clamp collar 66 to compress the clamp collet 64 and fix the clamp body 62 to the outer casing 44 of the electrical cable 12. The clamp collet 64 may include a tapered annular interface 70 (e.g., conical interface) to operatively contact a complementary tapered annular interface 72 of the clamp collar 66 such that the axial force may be translated to a radial force. For example, as the axial force is applied by the fasteners 68 to compress the clamp collar 66 onto the clamp collet 64, the tapered annular interface 70 of the clamp collet 64 is compressed radially, generating a radial inward force from the clamp collet 64 onto the electrical cable 12, securing the cable clamp 60 to the outer casing 44. In some embodiments, the clamp body 62 may include one or more body seals 74 (e.g., gaskets, O-rings, bellow seals, etc.) such that epoxy leakage along the exterior of the outer casing 44 (e.g., between the outer casing 44 and the cable clamp 60) is minimized or eliminated.

Figure 6:
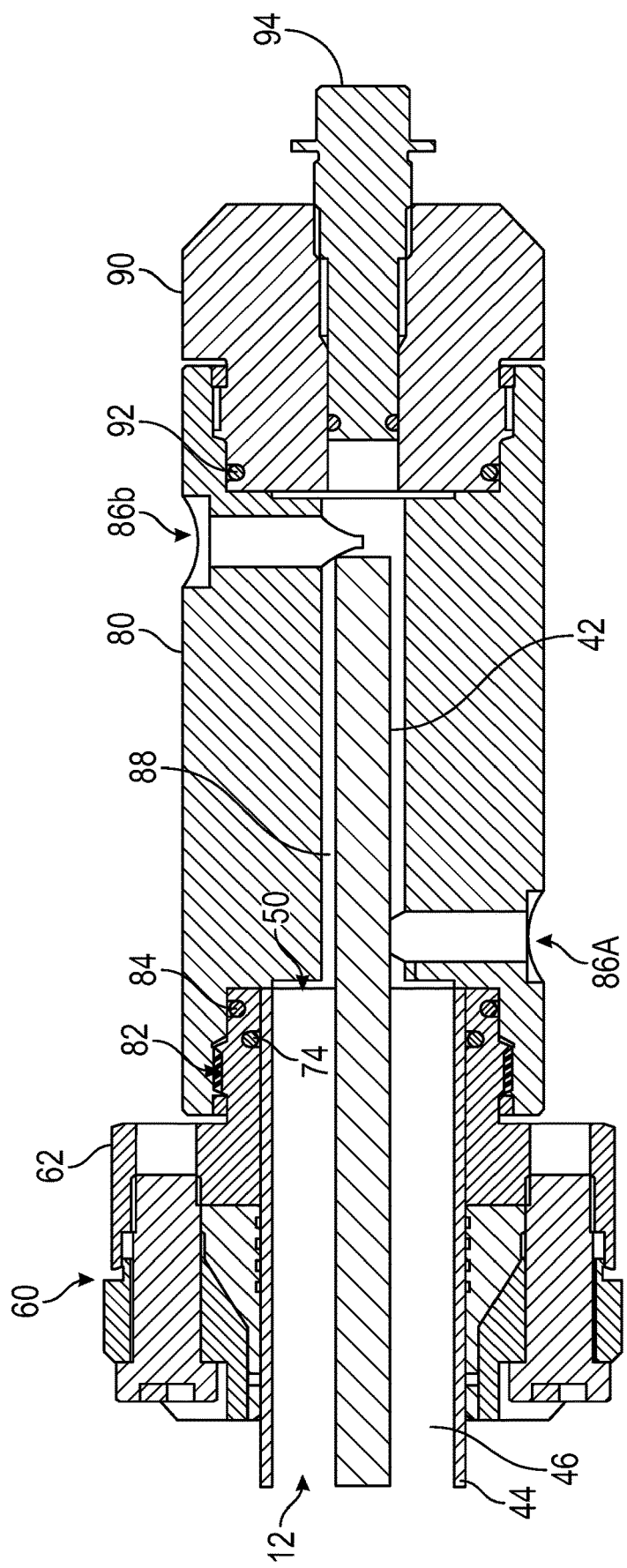
FIG. 6 is a schematic cross-sectional view of an example injection barrel coupled to the cable clamp and electrical cable of FIG. 5, according to an embodiment of the present disclosure.

The cable clamp 60 may allow for an injection barrel 80 (e.g., annular barrel) to be secured to the electrical cable 12, as shown in FIG. 6. For example, the clamp body 62 may include threads 82 or other securement to couple the injection barrel 80 to the cable clamp 60. Additionally, in some embodiments, the cable clamp 60 (e.g., the clamp body 62) and/or the injection barrel 80 may include one or more barrel seals 84 (e.g., gaskets, O-rings, bellow seals, etc.) to minimize or eliminate epoxy leakage between the injection barrel 80 and the cable clamp 60. The injection barrel 80 may include one or more ports 86 (e.g., port 86A and/or port 86B, cumulatively 86) for filling a chamber 88 within the injection barrel 80 with epoxy resin and/or for evacuating air from the chamber 88. For example, one port 86A may be used to fill the chamber 88 with epoxy while air is allowed to escape, naturally or via suction (e.g., using a vacuum), through the other port 86B. The chamber 88 may be open to the exposed end face 50 of the insulating material 46 such that pressurization of epoxy in the chamber 88 forces the epoxy into the insulating material 46. In some embodiments, the injection barrel 80 may include a removable endcap 90 and one or more cap seals 92 (e.g., gaskets, O-rings, bellow seals, etc.) disposed on the endcap 90 or the injection barrel 80. The endcap 90 may be removed to facilitate access to the chamber 88 (e.g., for a pre-filling of the chamber 88 with epoxy, cleaning of the chamber 88, etc.).

In some embodiments, the epoxy resin is a dielectric epoxy, such as to maintain the insulating electrical properties of the insulating material 46. Furthermore, in some embodiments, the epoxy resin may be of relatively low viscosity (e.g., less than 200 mPaS, less than 300 mPaS, less than 400 mPaS, etc.) such that the epoxy may be pressurized and permeated into the insulating material. As should be appreciated, any suitable epoxy, single or multi-part (e.g., two-part epoxy), having a viscosity low enough to permeate the insulating material 46 may be used.

In some embodiments, the chamber 88 (e.g., annular chamber) may be pressurized via the inflow of pressurized epoxy through a port 86. Additionally or alternatively, the port(s) 86 may be sealed (e.g., via one or more plugs (not shown)) and a piston 94 (e.g., annular piston) may be actuated (e.g., hydraulically actuated, electronically actuated, or actuated by hand) to pressurize the chamber 88. The piston 94 may be linearly actuated by an axial force or rotationally actuated (e.g., using a jackscrew) to move into the chamber 88, decreasing the volume within the chamber 88 and, thus, increasing the pressure within the chamber 88. For example, the piston 94 may include a threaded portion operatively screwed into the injection barrel 80 (e.g., through endcap 90) to a given torque to pressurize the epoxy in the chamber 88 to a particular pressure. For example, the piston 94 may be torqued to provide a pressure of 1000-3000 psi, 2000-4000 psi, 3000-5000 psi, 4000-6000 psi, or greater than or equal to 5000 psi. As should be appreciated, the applied pressure to facilitate permeation of the epoxy into the insulating material 46 may vary based on implementation (e.g., viscosity of the epoxy, porosity of the insulating material 46, etc.). In some embodiments, the pressure within the chamber 88 may be maintained at a desired level constantly or periodically to continue forcing the epoxy into the insulating material 46 until the epoxy has reached a handling time, reached a desired depth of penetration, or fully cured. For example, the piston 94 may be actuated every few minutes (e.g., every 1 minute, every 2 minutes, every 5 minutes, every 10 minutes, etc.) to maintain pressure within the chamber 88 as the epoxy permeates into the insulating material 46. Pressure may be maintained until the epoxy has reached a desired depth into the insulating material 46, until an intermediate setting (i.e., prior to full curing) of the epoxy, or until full curing of the epoxy. However, as should be appreciated, waiting until full curing of the epoxy may lead to difficulty removing the injection barrel 80, cable clamp 60, and/or excess epoxy from the electrical cable 12. The epoxy may penetrate the insulating material 46 by any suitable amount, and may depend on the insulating material 46 and the viscosity of the epoxy. For example, a relatively low viscosity epoxy may penetrate the insulating material 46 at least 2 mm, at least 5 mm, at least 20 mm, between 5 mm and 15 mm, between 15 mm and 25 mm, between 25 mm and 35 mm, or greater than 35 mm. In certain embodiments, the epoxy may penetrate the insulating material 46 to an axial depth of at least 10, 20, 30, 40, 50, 60, 70, 80, 90, or 100 percent of a diameter of the electrical cable 12. Additionally, as should be appreciated, the pressure utilized within the chamber 88 may be based on implementation (e.g., type and/or density of insulating material 46, viscosity of epoxy, desired depth of penetration, etc.).

Figure 7:
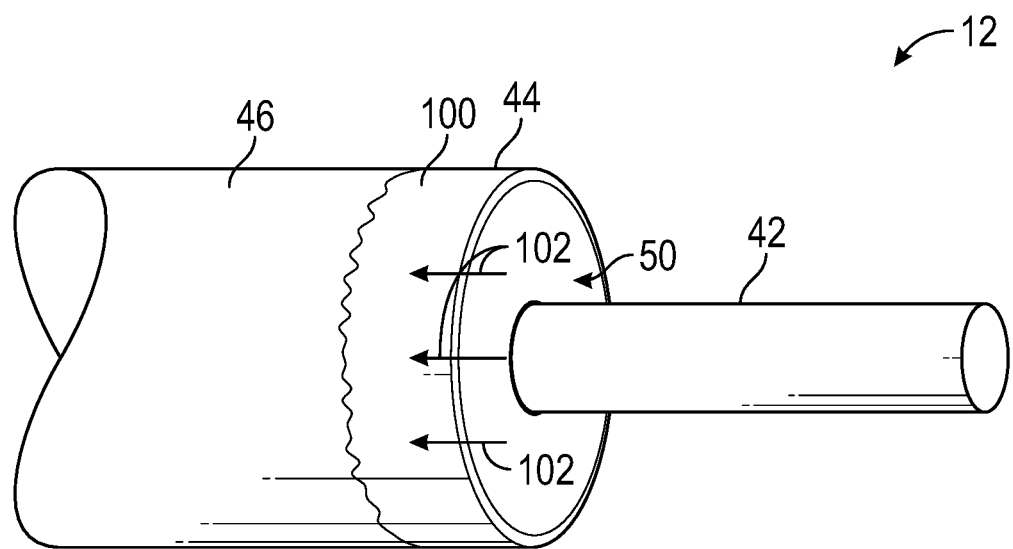
FIG. 7 is a perspective view of the electrical cable of FIG. 2 after having an epoxy-solidified portion of the insulating material, according to an embodiment of the present disclosure.

In some embodiments, the injection barrel 80 and the cable clamp 60 may be removed before the epoxy has fully cured. For example, after an initial setting time of the epoxy, the injection barrel 80 and the cable clamp 60 may be removed (e.g., for cleaning) and the electrical cable 12 may be allowed to sit until the epoxy fully cures. FIG. 7 is a perspective view of the electrical cable 12, after the epoxy has cured, including an epoxy-solidified portion 100 of the insulating material 46 that penetrates (shown via arrows 102) a distance into the end face 50 of the insulating material 46, according to an embodiment of the present disclosure. After curing, the epoxy-solidified portion 100 of the insulating material 46 may provide structural integrity to the insulating material 46 and act as a moisture barrier between the potentially hydroscopic insulating material 46 and the environment.

Figure 8:
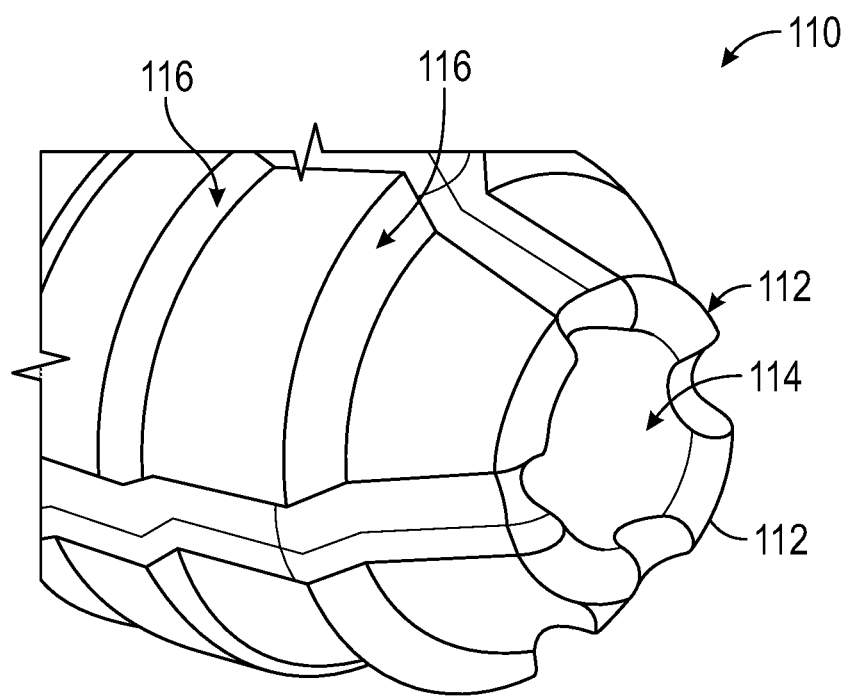
FIG. 8 is a perspective view of an example cutting tool for shaping the epoxy-solidified portion of the insulating material of FIG. 7, according to an embodiment of the present disclosure.

Additionally, in some embodiments, the epoxy-solidified portion 100 of the insulating material 46 may be shaped via a cutting tool 110, such as shown in FIG. 8. As should be appreciated, cutting may occur after full curing of the epoxy or before full curing if the epoxy has set enough to be handled. In some embodiments, the cutting tool 110 may include abrasive edges 112 (e.g., diamond, corundum, silicon carbide, etc.) to cut into the epoxy-solidified portion 100 of the insulating material 46. Moreover, the cutting tool 110 may have an opening 114 through which the conductor 42 may be fed to facilitate radially symmetric cutting of the epoxy-solidified portion 100 of the insulating material 46 about the axial axis 40 without damaging the conductor 42. Additionally, in some embodiments, the cutting tool 110 may include one or more topological characteristics 116 such as chamfers or bevels to generate different geometries in the epoxy-solidified portion 100 of the insulating material 46. For example, the epoxy-solidified portion 100 of the insulating material 46 may be shaped to match one or more connection profiles associated with a desired connection of the electrical cable 12. As should be appreciated, any suitable cutting tool 110 may be used to generate any desired shape for facilitating a particular termination/connection.

Figure 9:
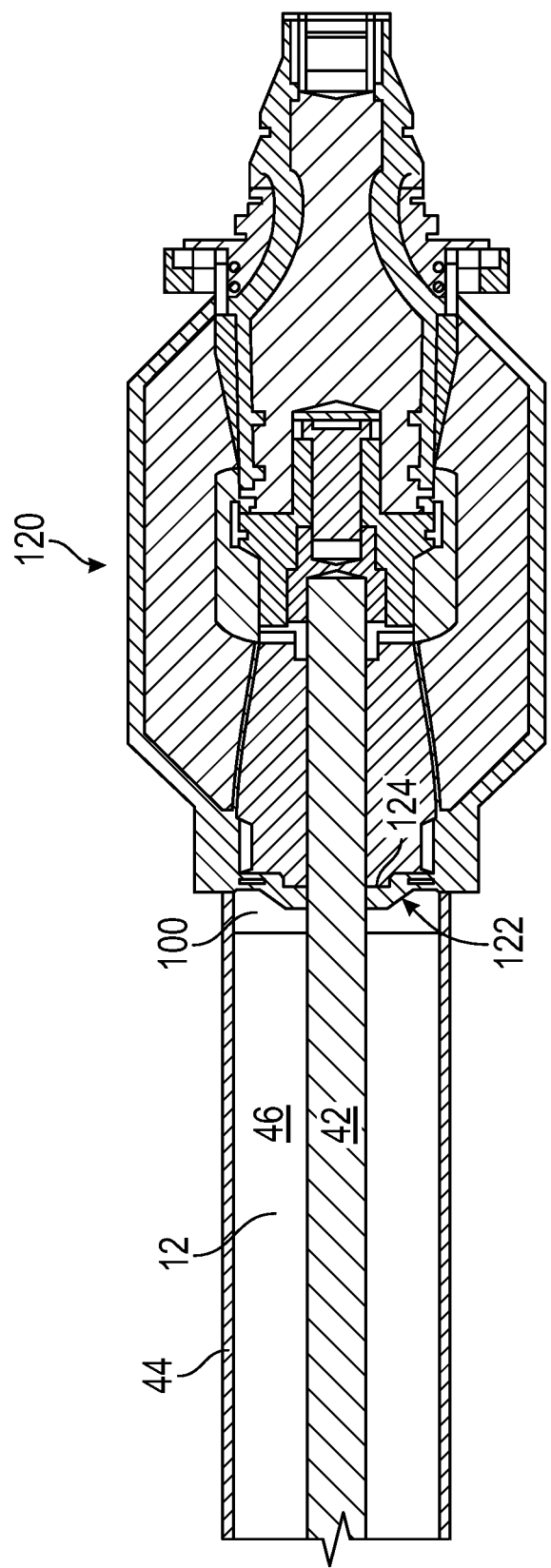
FIG. 9 is a schematic cross-sectional view of an example cable connection utilizing an electrical cable prepared with an epoxy-solidified portion of the insulating material, according to an embodiment of the present disclosure.

FIG. 9 is a schematic cross-sectional view of an example cable connection 120 utilizing an electrical cable 12 prepared with an epoxy-solidified portion 100 of the insulating material 46, according to an embodiment of the present disclosure. In one embodiment, the cable connection 120 may be an electrical connection described in U.S. Pat. No. 7,731,515, which is incorporated herein by reference in its entirety. In the depicted embodiment, a connector geometry 122 has been cut into the epoxy-solidified portion 100 of the insulating material 46 to form a basis for interfacing (e.g., seating, sealing, etc.) with another insulator 124 with reduced or eliminated air gaps, which may improve tracking resistance and/or other electrical properties/characteristics of the connection. As should be appreciated, the cable connection 120 is shown as an example and is, as such, non-limiting. Indeed, the systems and methods of the present disclosure may be utilized for any connection utilizing an electrical cable 12 that may benefit from epoxy resin injection preparation.

Figure 10:
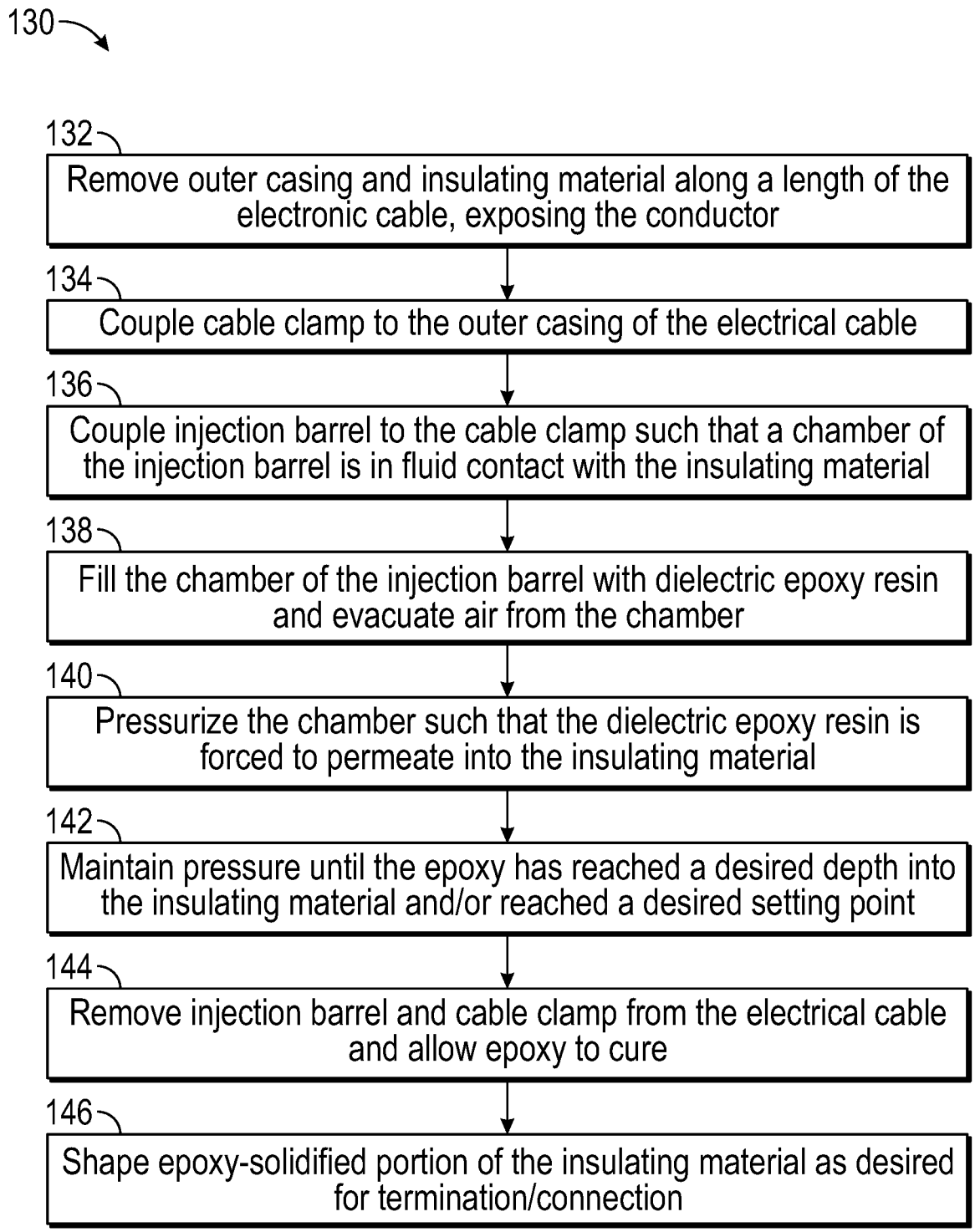
FIG. 10 is a flowchart of an example process for preparing an electrical cable for termination/connection via epoxy resin injection, according to an embodiment of the present disclosure.

FIG. 10 is a flowchart of an example process 130 for preparing an electrical cable 12 for termination/connection via epoxy resin injection, according to embodiments of the present disclosure. In some embodiments, to prepare the electrical cable 12 for termination/connection via epoxy resin injection, a length 48 of the outer casing 44 and insulating material 46 may be removed, exposing a portion of the conductor 42 (process block 132). Additionally, a cable clamp 60 may be coupled to the outer casing 44 of the electrical cable 12 (process block 134), and an injection barrel 80 may be coupled to the cable clamp 60 such that a chamber 88 of the injection barrel 80 is in fluid contact with the insulating material 46 (process block 136). The chamber 88 may be filled with a dielectric epoxy resin (e.g., via one or more ports 86) and air may be evacuated from the chamber (process block 138). Furthermore, the chamber 88 may be pressurized such that the dielectric epoxy resin is forced to permeate into the insulating material 46 (process block 140). Pressure may be maintained until the epoxy has reached a desired depth into the insulating material and/or reached a desired setting point (i.e., an amount of curing) (process block 142). The injection barrel 80 and the cable clamp 60 may be removed, and the epoxy may be allowed to cure (process block 144). After curing, the epoxy-solidified portion of the insulating material 46 may be shaped (e.g., via a cutting tool 110) as desired to facilitate termination/connection of the electrical cable 12 (process block 146).

The technical effects of the systems and methods described in the embodiments of FIGS. 1-10 include the injection of a solidifying material into a porous and/or powdered insulating material 46 that forms an annulus around a conductor 42 of an electrical cable 12. The insulating material 46 may include one or more of polymers, ceramics, porcelains, glass, fabrics, or any combination, wherein the insulating material 46 may be porous or distributed as a plurality of insulating elements (e.g., powder, fibers, particles, etc.). The solidifying material may include one or more epoxy resins, polymers (e.g., thermosetting polymers), polyester, vinyl, polyimides, polyurethane, nylon, or any combination thereof. For example, the solidifying material may include a dielectric epoxy resin. The epoxy injection may provide for a more stable, physically shapeable, and sealed terminal end of the electrical cable 12, which may further provide improved electrical properties such as improved tracking resistance. Furthermore, although the above referenced flowchart is shown in a given order, in certain embodiments, process blocks may be reordered, altered, deleted, and/or occur simultaneously. Additionally, the referenced flowchart is given as an illustrative tool and further decision and process blocks may also be added depending on implementation.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A method for preparing an electrical cable, comprising:
coupling an injection barrel to the electrical cable, wherein the electrical cable comprises one or more conductors surrounded by a porous insulating material within an outer casing;
injecting, via one or more ports, epoxy resin into a chamber of the injection barrel, wherein the chamber surrounds the one or more conductors and is fluidly coupled to an end face of the porous insulating material;
pressurizing the chamber such that the epoxy resin is forced to penetrate into the end face of the porous insulating material; and
removing the injection barrel to expose an epoxy-injected portion of the porous insulating material.

2. The method of claim 1, comprising waiting for the epoxy-injected portion of the porous insulating material to cure to generate an epoxy-solidified portion of the porous insulating material.

3. The method of claim 2, comprising shaping, via a cutting tool, the epoxy-solidified portion of the porous insulating material according to a connection profile.

4. The method of claim 3, wherein the cutting tool comprises a diamond abrasive cutting tool.

5. The method of claim 1, comprising coupling a cable clamp to the outer casing of the electrical cable, wherein the injection barrel is coupled to the electrical cable via the cable clamp.

6. The method of claim 5, wherein the cable clamp comprises a compression fitting configured to secure the cable clamp to the outer casing of the electrical cable.

7. The method of claim 1, wherein the porous insulating material comprises powdered magnesium oxide (MGO).

8. The method of claim 1, comprising removing a length of the outer casing of the electrical cable and the porous insulating material, leaving an exposed portion of the one or more conductors.

9. The method of claim 1, wherein the injection barrel comprises a piston configured to actuate into the chamber, wherein pressurizing the chamber comprises actuating the piston into the chamber.

10. The method of claim 1, wherein the injection barrel comprises a plurality of ports configured to evacuate air from the chamber and fill the chamber with the epoxy resin.

11. The method of claim 1, wherein the one or more conductors comprise nickel alloy or copper cores.

12. A method for connecting a prepared electrical cable, comprising:
inserting the prepared electrical cable into a cable connection, wherein the cable connection comprises a first geometry and the prepared electrical cable comprises a shaped epoxy-solidified portion of a porous insulating material comprising a second geometry complementary to the first geometry, wherein the prepared electrical cable is prepared by:
coupling an injection barrel to an unprepared electrical cable, wherein the unprepared electrical cable comprises one or more conductors surrounded by the porous insulating material within an outer casing;
injecting, via one or more ports, epoxy resin into a chamber of the injection barrel, wherein the chamber surrounds the one or more conductors and is fluidly coupled to an end face of the porous insulating material;
pressurizing the chamber such that the epoxy resin is forced to penetrate into the end face of the porous insulating material;
removing the injection barrel to expose the epoxy-injected portion of the porous insulating material; and
cutting into the epoxy-injected portion of the porous insulating material to generate the second geometry.

13. The method of claim 12, wherein coupling the injection barrel to the unprepared electrical cable comprises securing a cable clamp to the outer casing of the unprepared electrical cable and mechanically coupling the injection barrel to the cable clamp.

14. The method of claim 12, wherein the epoxy resin comprises a dielectric epoxy resin.

15. The method of claim 12, wherein the insulating material comprises an inorganic mineral material.

* * * * *